A. KUNKLE.
Reflecting Lamp-Chimneys.

No. 134,432. Patented Dec. 31, 1872.

UNITED STATES PATENT OFFICE.

ADAM KUNKLE, OF BIRMINGHAM, PENNSYLVANIA.

IMPROVEMENT IN REFLECTING LAMP-CHIMNEYS.

Specification forming part of Letters Patent No. 134,432, dated December 31, 1872.

*To all whom it may concern:*

Figure 1:
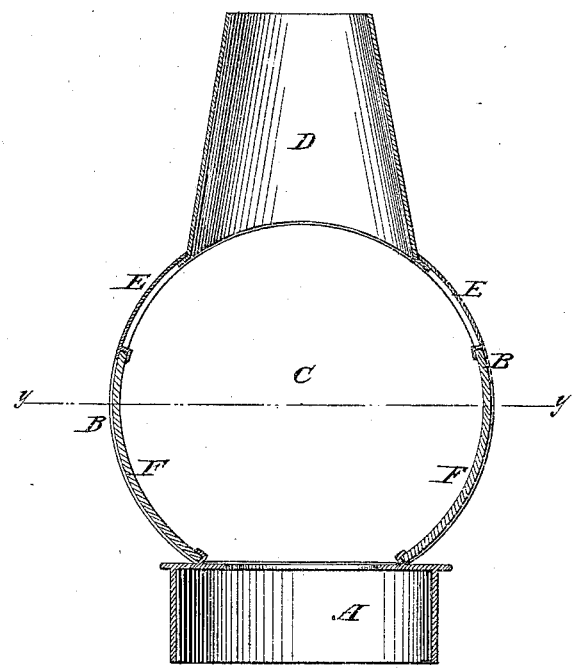
Figure 2:
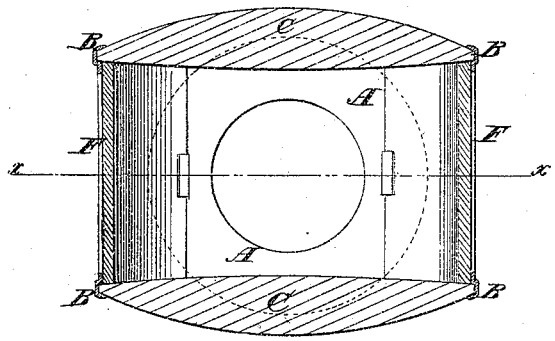

Be it known that I, ADAM KUNKLE, of Birmingham, Buchanan post-office, in the county of Allegheny and State of Pennsylvania, have invented a new and useful Improvement in Reflecting Lamp-Chimneys, of which the following is a specification:

Figure 1 is a detail vertical section of my improved lamp-chimney taken through the line $x$ $x$ of Fig. 2. Fig. 2 is a horizontal section of the same taken through the line $y$ $y$, Fig. 1.

Similar letters of reference indicate corresponding parts.

My invention has for its object to furnish an improved lamp-chimney which shall be so constructed as to throw a stronger light and be less liable to break than the ordinary glass lamp-chimneys, and which will not require a shade when the lamp is used for reading, sewing, and similar purposes, and which shall be simple in construction and convenient in use, being easily cleaned.

I will proceed to describe the construction of the same.

A is the base that fits upon the lamp-burner; C, bull's-eyes or lenses; and D, a tapering top. These parts are attached to and connected by a frame, B, as shown, and the lenses may be hinged or made detachable, if desired, to permit them to be readily or conveniently cleaned. The parts A B D are formed of sheet metal, as are also the plates E E, which extend downward from the top D. F F are glass plates which fill the space between plates E and the base A.

If desired, the plates F may be dispensed with and the plates E continued down to the base in lieu thereof. The rays of light will thus pass laterally through the lenses C, and also be radiated downward by the plate E through the glass plates F; or, if these last be dispensed with, the lenses will be the only illuminated portions.

What I claim is—

1. The combination of the base A, metallic frame B, lenses C, top D, and plates E, substantially as shown and described.

2. In combination with the plate E, the frame B, lenses C, and the glass plates F, as and for the purpose specified.

ADAM KUNKLE.

Witnesses:
GEORGE FLECKER,
THOMAS MILLER.